UNITED STATES PATENT OFFICE.

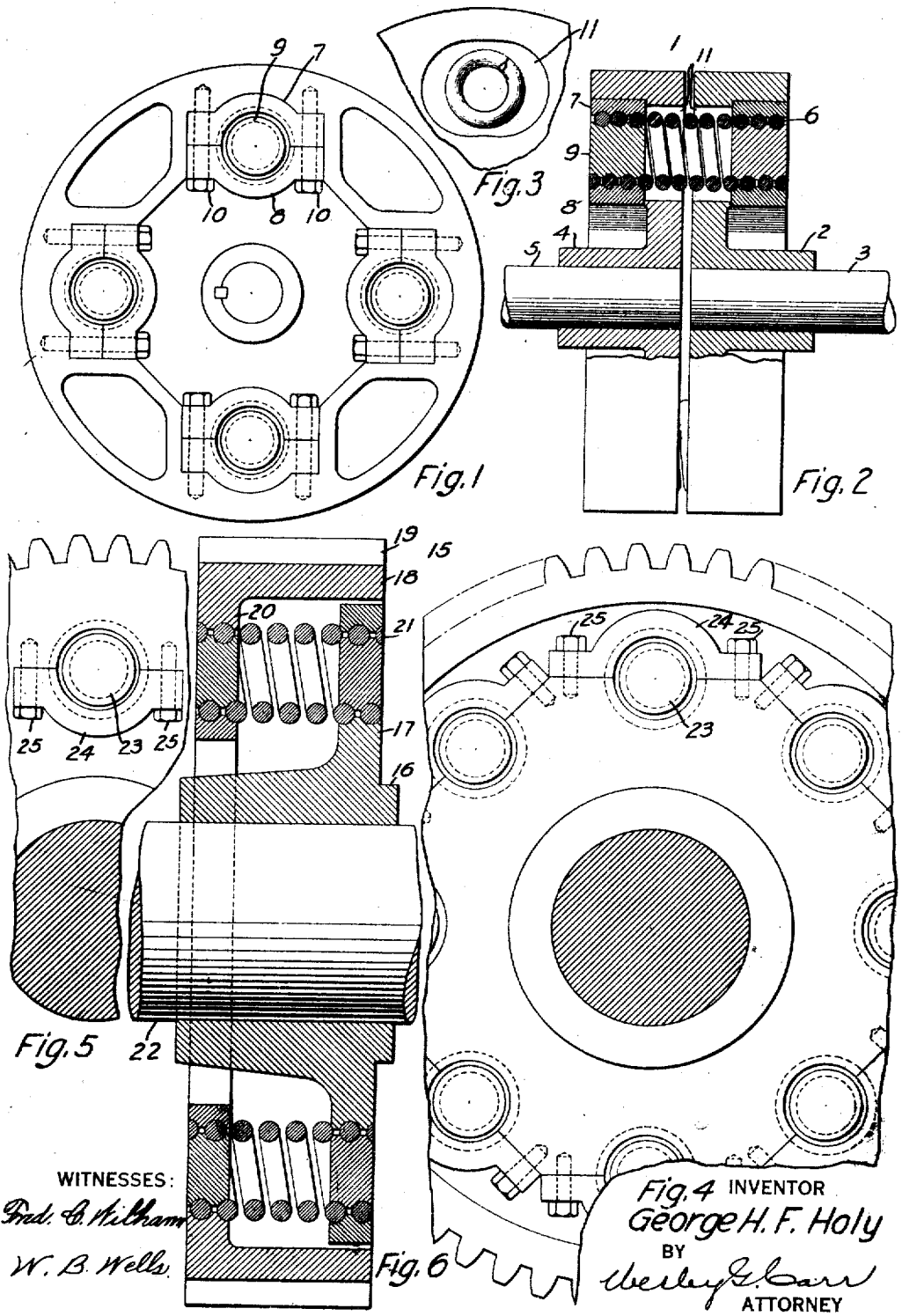

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

FLEXIBLE COUPLING.

1,284,683.  Specification of Letters Patent.  Patented Nov. 12, 1918.

Application filed July 6, 1917. Serial No. 178,886.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Flexible Couplings, of which the following is a specification.

My invention relates to resilient driving connections and particularly to resilient gear wheels.

One object of my invention is to provide a resilient driving connection that shall be simple and rugged in construction and have the driving and the driven parts thereof connected by resilient means which may be conveniently removed for repairs and replacement.

Another object of my invention is to provide a resilient driving connection of the above-indicated character that shall embody a driving and a driven member having a common axis of rotation and a plurality of resilient members for joining the driving and the driven part, which shall be disposed parallel to the axis of rotation of said members.

More specifically, my invention embodies a driving connection provided with a driving member having a radially disposed flange extending therefrom, a driven member having a flange disposed parallel to the flange extending from the driving member, a plurality of helical springs which are disposed parallel and symmetrical to the common axis of rotation of said members, and a plurality of clamps and wedge members for securing the springs to the driving and the driven members in order to form a resilient connection therebetween.

In a driving connection constructed in accordance with my invention, the resilient connecting means between the driving and the driven members are disposed in a manner to obtain an efficient dynamic balance of the moving parts which is difficult to obtain in the driving connections now in service that are provided with spring connectors disposed perpendicular to planes extending through the axis of rotation of the driving members.

In the accompanying drawing, Figure 1 is an end elevational view of a driving connection constructed in accordance with my invention; Fig. 2 is a view, partially in side elevation and partially in section, of the gear wheel illustrated in Fig. 1; Fig. 3 is a detail view of a portion of the driven member illustrated in Figs. 1 and 2; Fig. 4 and Fig. 5 are side elevational views of portions of a gear wheel constructed in accordance with my invention, and Fig. 6 is a sectional view of the gear wheel illustrated in Figs. 4 and 5.

Referring to Figs. 1, 2 and 3 of the drawing, a driving connection 1 embodies a driving member 2 that is mounted upon a shaft 3 and a driven member 4 that is mounted upon a shaft 5. The driving and the driven members 2 and 4 are similar in construction and are resiliently joined together by a plurality of helical springs 6 which are disposed parallel and symmetrical to the shafts 3 and 5 upon which the driving members 2 and 4 are mounted.

Inasmuch as the driving and the driven members 2 and 4 are similar in construction and the springs 6 are connected to the two members in a similar manner, only one member, namely, driven member 4, and the means for connecting one spring thereto will be described in detail.

An end portion of the spring 6 is secured to the driven member 4 by means of two clamping members 7 and 8 and a wedge member 9. The clamping members 7 and 8 and the wedge member 9 are provided with threads of a pitch similar to the pitch of the spring 6 in order to avoid straining the spring and hold the same securely in position, when clamped by means of the bolts 10.

Portions of the driving and of the driven member surrounding the springs 6 are cored out to form pockets 11, as indicated in Figs. 2 and 3 of the drawing, in order to prevent interference with the movement of the springs 6 when the driving and the driven members are given relative movement.

From the above description, it will be noted that the shaft 3 and the driving member 2 are resiliently joined to the shaft 5 and the driven member 4 by means of a plurality of helical springs 6 which are symmetrically disposed relative to the common axis of rotation in order to maintain a perfect dynamic balance of the moving parts. Moreover, it will be apparent that a spring may be removed for repair or replacement in a convenient manner by the removal of the bolts 10 which are associated with the driving and the driven members.

Referring to Figs. 4, 5 and 6, a gear wheel 15 embodies a hub member 16 having a flange projection 17 extending therefrom and a rim member 18 provided with gear teeth 19 and having a flange projection 20 extending therefrom which is disposed parallel to the flange 17 extending from the hub member 16. The hub and the rim member are resiliently connected together by means of a plurality of helical springs 21 that are disposed parallel and symmetrical to the shaft 22 upon which the hub member 16 is mounted.

The springs 21 are rigidly secured to the hub member 16 by wedges 23, clamps 24 and bolts 25. The clamps 24 and the wedges 23 are provided with threads of the same pitch as the spring 21 and, when clamped in position by means of the bolts 25, are adapted to prevent any movement of the coils of the springs engaged thereby.

The end portions of the springs 21 that are associated with the rim member 18 are provided with a similar set of wedges 23, clamps 24, and bolts 25 for rigidly securing the end portions thereof to the rim member. It will be noted that a gear wheel constructed in accordance with my invention, as set forth, will have substantially perfect dynamic balance and may be constructed at a minimum cost, as the hub and the rim members may be conveniently rolled from a forged blank with facility.

Modifications in the structure and arrangement and location of parts may be made within the spirit and scope of my invention and such modifications are intended to be covered by the appended claims.

I claim as my invention:

1. In a resilient connection, the combination with a driving and a driven member, of a plurality of elongated helical springs for resiliently joining said members, said springs being located parallel to the axis of rotation of said members.

2. In a resilient connection, the combination with a driving member having a flange portion extending radially therefrom, and a driven member having a flange portion disposed adjacent to the flange portion extending from said driving member, of a plurality of elongated helical springs disposed parallel to the axis of said members and rigidly secured to the flange portions thereof.

3. In a resilient connection, the combination with a driving and a driven member having a common axis of rotation, of a plurality of elongated helical springs disposed parallel to the axis of rotation of said members, and means for rigidly securing said springs to the driving and the driven members.

4. In a resilient connection, the combination with a driving and a driven member having radially disposed flanges extending therefrom, of a plurality of helical springs disposed parallel to the common axis of rotation of said members, and clamp-and-wedge members for securing said springs to the flanges in order to resiliently join the driving and the driven members.

5. In a resilient connection, the combination with a driving member having a radial flange extending therefrom, and a driven member having a flange portion extending parallel to the flange portion extending from the driving member, of a plurality of helical springs disposed parallel, and in symmetrical relation, to the common axis of rotation of said members, and wedge-and-clamp members for securing said springs to the flanges extending from the driving and the driven members.

6. In a resilient connection, the combination with a driving and a driven member having a common axis of rotation, of a plurality of helical springs disposed parallel to the axis of rotation of said members, and means comprising wedge members and clamps for securing said springs to the driving and to the driven member in order to effect a resilient connection therebetween.

7. In a resilient connection, the combination with a driving and a driven member having a common axis of rotation, of a plurality of helical springs disposed parallel and symmetrical to the axis of rotation of said members, and means comprising a plurality of wedge members and clamps for securing the respective ends of said springs to the driving and the driven member in order to effect a resilient connection therebetween.

8. In a resilient gear wheel, the combination with a hub member having a radial projection extending therefrom, and a rim member having a radial projection located adjacent to said hub projection, of means embodying cylindrical helical springs disposed parallel to the axis of said members for resiliently joining said members.

9. In a resilient gear wheel, the combination with a hub member having a flange portion extending radially therefrom, and a rim member having a flange portion disposed adjacent to the flange portion of said hub member, of a plurality of helical springs disposed parallel to the axis of said members and having their center lines located equal distances from the center of rotation of the gear wheel, and means for securing said springs to the flange portions of said members, whereby the two members are resiliently joined together.

10. In a resilient gear wheel, the combination with a hub member having a flange extending therefrom and a rim member having a flange portion disposed adjacent to the flange portion extending from said hub member, said members having a common axis of rotation, of a plurality of helical springs disposed parallel and symmetrical to the axis of rotation of said members, and means comprising a plurality of wedge members and clamps for securing said springs to the flange portions of said members, whereby the two members are resiliently joined together.

11. In a resilient gear wheel, the combination with a hub member having a flange extending radially therefrom, and a rim member provided with gear teeth around the periphery and having a flange portion disposed parallel to the flange extending from said hub member, of a plurality of springs disposed parallel to and to the side of the center line of the axis of rotation of said members, and means for securing the springs to said members in order to effect a resilient connection therebetween.

In testimony whereof, I have hereunto subscribed my name this 28th day of June, 1917.

GEORGE H. F. HOLY